May 17, 1960 T. L. THOURSON 2,937,276
QUANTITATIVE DETERMINATION OF METALS
Filed March 29, 1956 4 Sheets-Sheet 4

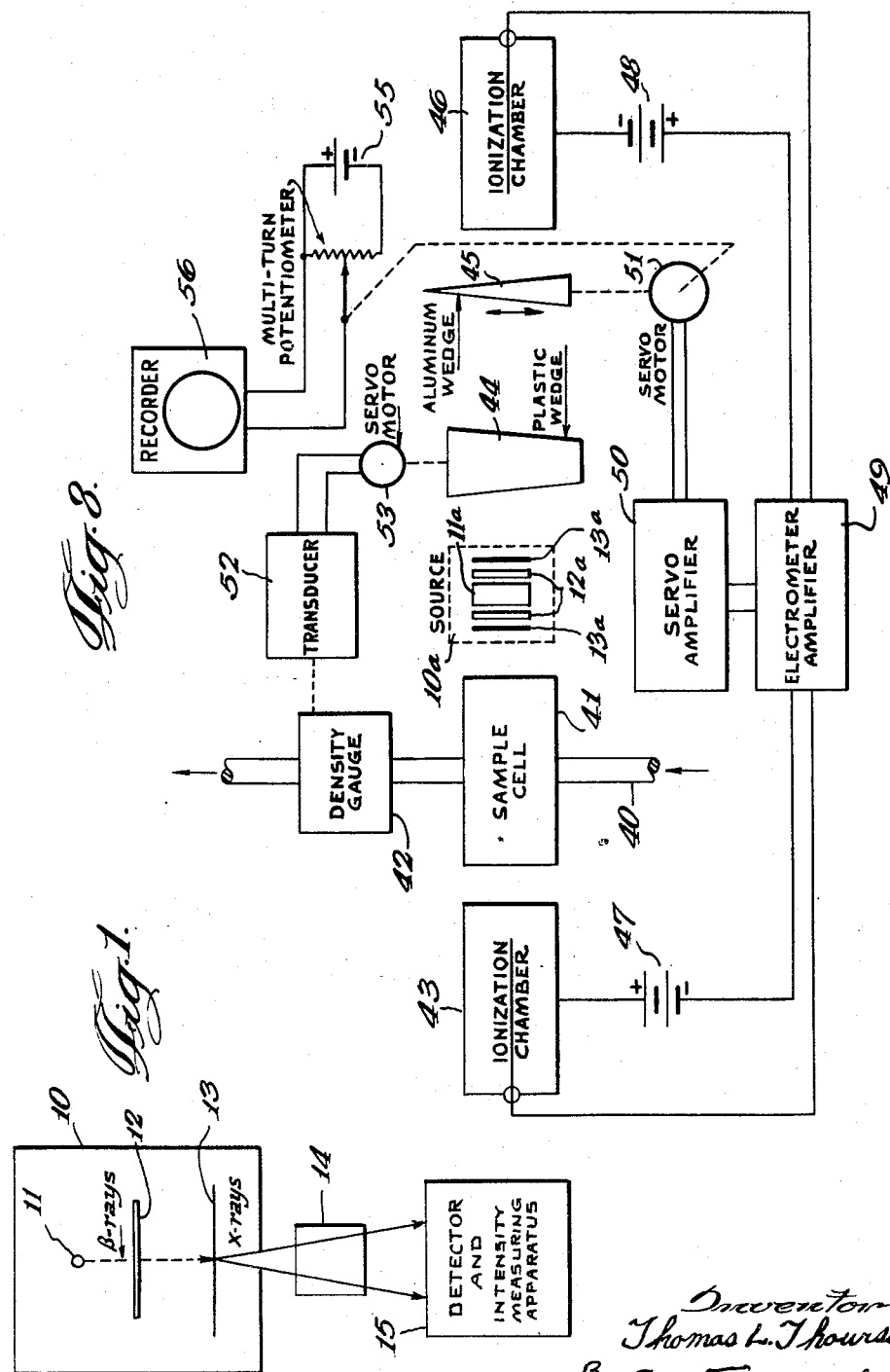

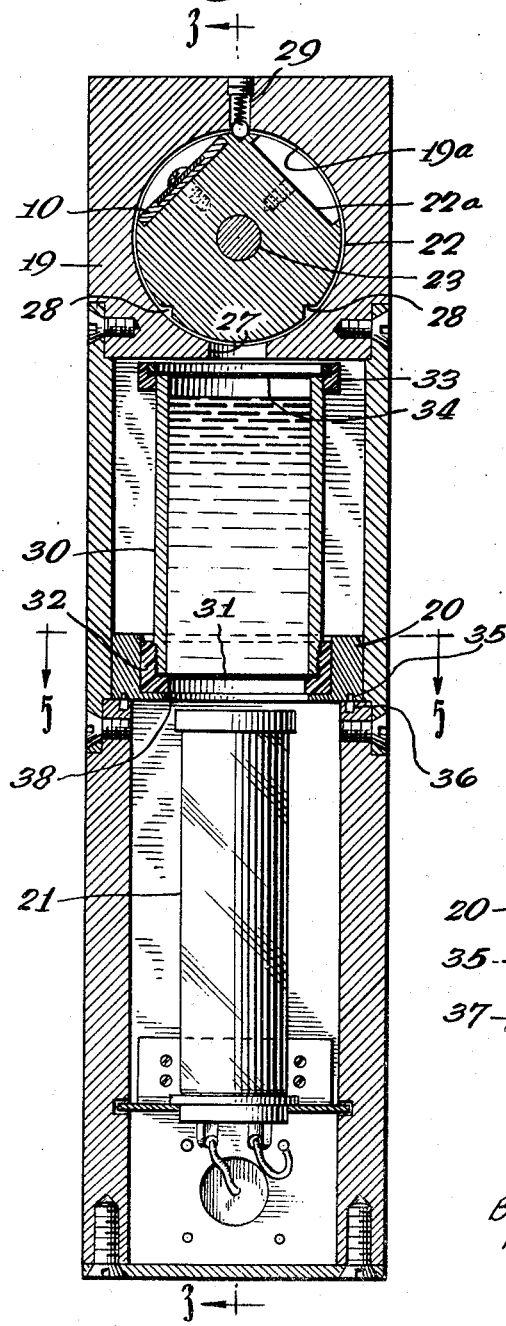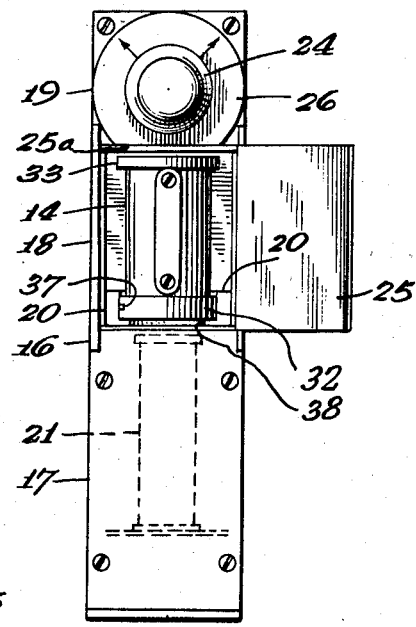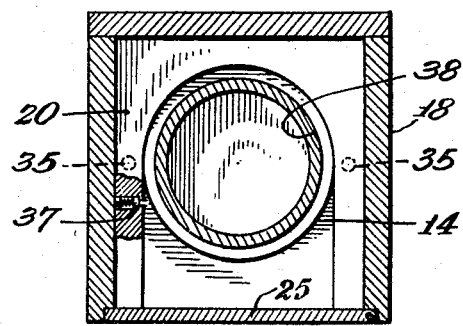

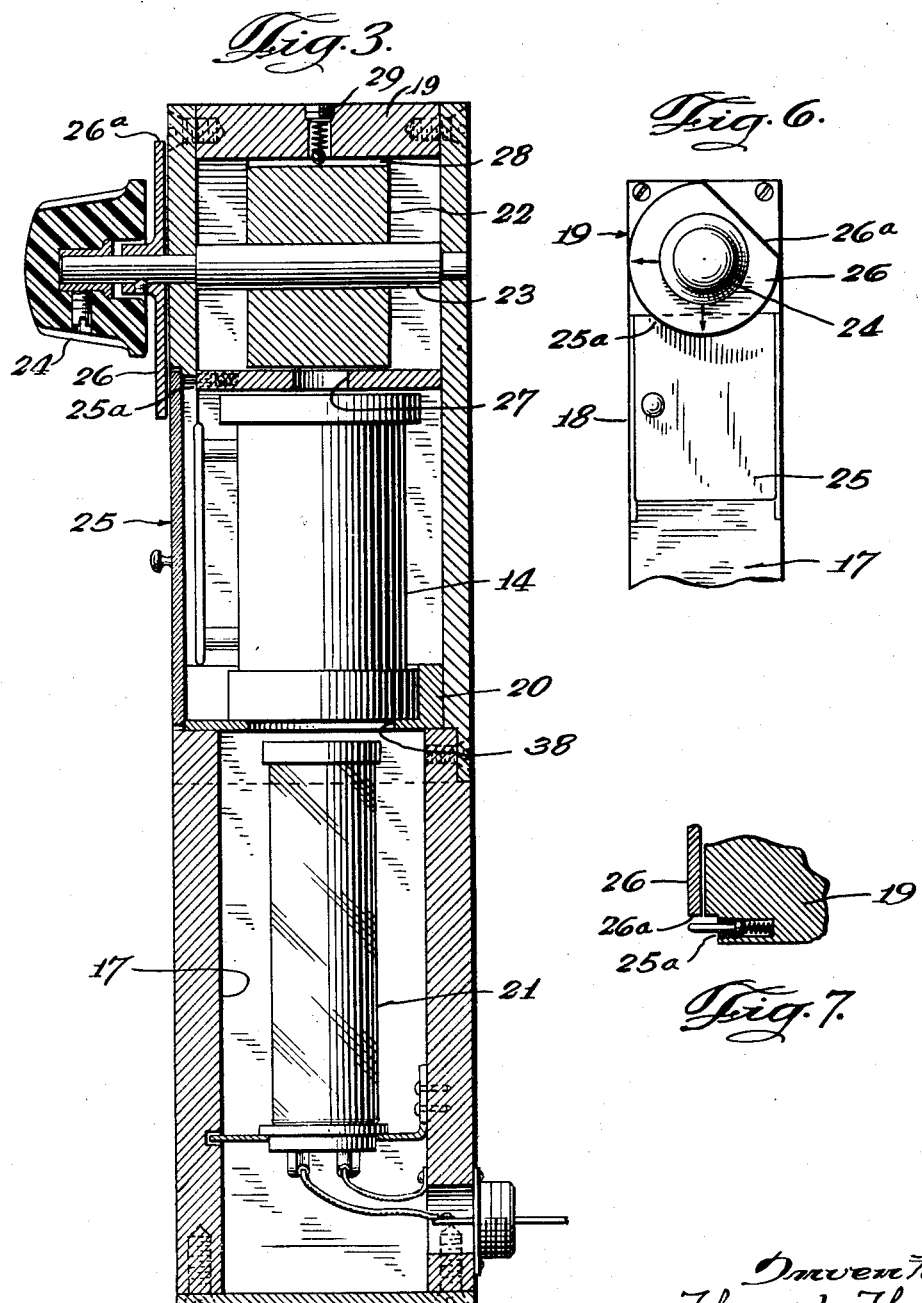

Inventor
Thomas L. Thourson
By Everett A. Johnson
Attorney

United States Patent Office 2,937,276
Patented May 17, 1960

2,937,276

QUANTITATIVE DETERMINATION OF METALS

Thomas L. Thourson, Park Forest, Ill., assignor to Standard Oil Company, Chicago, Ill., a corporation of Indiana Application March 29, 1956, Serial No. 574,877

5 Claims. (Cl. 250—43.5)

This invention relates to quantitative analysis by means of X-ray absorption and, more particularly, relates to a system for quantitatively determining the concentration of tetraethyllead fluid in gasoline.

Analytical techniques have been proposed heretofore for such determinations but such techniques have required relatively complicated and expensive equipment, or are time consuming, and are not readily adapted to routine analysis. However, there is an ever increasing need for plant quality control devices and it is a primary object of this invention to provide a system which is adapted for use in the continuous determination of the concentration of tetraethyllead (TEL) in a flowing stream of leaded gasoline.

Another object of thte invention is to provide an improved method and apparatus particularly adapted for rapid and routine analysis of elements of high atomic weight in a matrix of low atomic weight. Another object of our invention is to provide an apparatus and method for the analysis of the concentration of tetraethyllead in gasoline without the necessity for preparing extracts of the gasoline and without calculations and plotting of graphs and charts. These and other objects of our invention will become apparent as the description thereof proceeds.

Briefly, I attain the objects of the invention by providing a system which is based upon the relatively large absorption by atomic lead of the X-rays produced when beta particles from strontium 90 bombard a thin molybdenum foil, the X-rays from the strontium 90-molybdenum foil source being passed through a leaded sample of gasoline. As the X-rays pass through the sample, they will be absorbed, in part, by the gasoline, by the tetraethyllead, and by any other components present; thus in view of the relatively large absorption by atomic lead the greater the concentration of tetraethyllead in the sample, the greater will be the absorption of the X-rays. Therefore, the intensity of the transmitted X-rays is a function of the tetraethyllead concentration of the sample, which concentration can be determined by measuring the transmitted X-ray intensity.

Inasmuch as the transmitted X-rays are absorbed in part by the gasoline or other hydrocarbons present, the transmitted X-ray measurement is sensitive to the varying carbon to hydrogen ratio of different base stocks. We eliminate the sensitivity to the carbon to hydrogen ratio by producing X-rays whose effective wave length is about 0.6 A. X-rays whose wave lengths are shorter than about 0.6 A. are produced by the more energetic beta particles from the strontium 90 and we can reduce the beta particle energy by interposing an attenuater composed of low atomic number elements such as carbon between the strontium 90 and the molybdenum foil target.

To permit a continuous determination in terms of volume concentration in different base stocks, it is necessary that a density correction be made. This can be done automatically by employing a density gauge and transducer, the output signal of which may be supplied to a computer or may be used to adjust the position of a compensating wedge in the X-ray beam.

Further details of construction and advantages of my system will be given in conjunction with the description of the accompanying drawings illustrating preferred embodiments of the invention and wherein:

Figure 1 is a schematic diagram of an apparatus employing an X-ray source;

Figure 2 is a front elevation;

Figures 3 and 4 are vertical sections of the apparatus of Figure 2;

Figure 5 is a section taken along 5—5 in Figure 4;

Figure 6 is a fragmentary view of the apparatus of Figure 2;

Figure 7 is an enlarged detail of elements in Figure 2;

Figure 8 is a schematic diagram of a second embodiment of our invention applied to a continuous system and including means for making a density correction;

Figure 9:
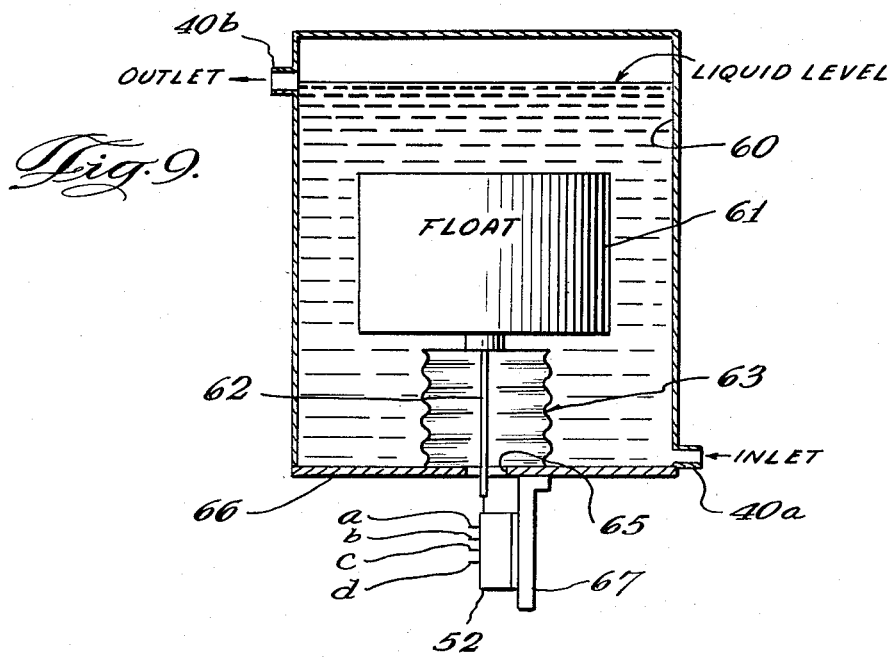
Figure 9 is an elevation schematically illustrating a density gauge for use in the apparatus of Figure 8.

Referring to the drawings, the X-ray source 10 comprises a beta ray emitter 11 which is a radio isotope such as strontium 90, a beta ray attenuater 12, and a foil target 13 from which the X-rays are emitted. The beam from the source 10 is passed through the sample cell 14 and the transmitted X-ray intensity measured by the detector, and associated current measuring or pulse counting circuitry represented by 15. The current measuring means may comprise an ionization chamber and the pulse counter a Geiger tube. Circuits including such components are well known to the art and will not be described in detail herein.

Referring to Figures 2 to 7, the housing 16 includes three compartments; the detector tube shield 17, the sample cell chamber 18, and the radiation source housing 19. The sample cell chamber 18 is provided with an indexed holder 20 for positioning the sample cell 14 in alignment with the radiation source 10 and the detector 21.

The shield or housing 19 for the source 10 encloses a rotatable body 22 provided with shaft 23. Within the body 22 is disposed the source 10 which is comprised of the beta ray emitter 11 and the foil target 13. A knob 24 is provided for rotating the shaft 23 supporting the body 22 within the shield 19 so as to expose the radiation source 10 to the sample cell 14.

The sample chamber 18 is provided with a door 25. The shaft 23 for rotating the radiation source body 22 carries a rotatable disc 26 having a chordal section cut away to permit the opening of the door 25 only when the radiation source 10 is in its shielded position. To prevent exposing the source 10 within the rotatable body 22 if the door 25 has not been closed we may provide a recessed and spring loaded pin means 25a. When the door 25 is closed, however, the pin 25a is displaced and the disc 26 is free to rotate over the outer surface of the door 25.

The X-ray source 10, comprising the $Sr^{90}$ beta ray emitter 11 and the molybdenum foil target 13, is mounted within recess 22a in the rotatable body 22. This body in turn is disposed in a close fitting bore 19a within the shield or housing 19. The shield 19, the body 22, and the housing 16 are constructed of material, such as stainless steel, which is relatively impervious to the beta rays.

It will be understood that when the instrument is not in use or when the sample cell 14 is being introduced or removed from the sample cell chamber 18, the source 10 is retained within the upper part of the housing or shield 19. To indicate the position of the source we provide an index on the disc 26 and also provide positive stop means 28 and 29 carried by the rotatable body 22 and the fixed shield 19, respectively.

The sample cell 14 is comprised of a metal body 30, an aluminum foil 31 at the bottom, a threaded ring 32 for holding the aluminum window in place and a top cap 33 comprising an aluminum foil sheet 34, and a plastic ring in vapor tight contact with the top of the cell. The sample cell holder 20 fits into the sample cell 18 and is provided with two fixed pins 35 which fit into matching holes 36 in the top of the detector shield 17. The curvature of the back wall of the sample cell holder 20 matches the curvature of the sample cell 14, this curvature along with a spring load pin means 37 in the sample cell holder 20 provides exact and reproducible positioning of the sample cell 14. The base of the holder 20 is provided with a port 38 which is aligned with the sample cell window 31 and the port 27 in the shield 19.

After the sample cell 14 is in place, and the sample chamber door 25 is closed, the source holder 22 is rotated by means of the knob 24 on the front of the housing 19 until the source 10 and target 13 are opposite a port 27 in the bottom of the housing 19. With the source 10 in this position, the safety stop disc 26, which is attached to the knob shaft 23, prevents the sample chamber door 25 from being opened. X-rays from the source 10 can then pass through the sample cell 14.

The detector tube shield 17 encloses a suitable detector means such as a Geiger-Müller tube 21 which is connected with conventional counting and high voltage equipment. We prefer to use a Geiger-Müller tube which possesses a thin aluminum end window to pass soft radiation and should contain argon and krypton as the filling gas, these gases being efficient absorbers of soft radiation. The Geiger-Müller tube should be mounted so that the end window is exposed to the transmitted radiation.

Referring to Figure 8, I have schematically illustrated another embodiment of my invention which is adapted for use on a continuous flowing stream bed. The product flows through a by-pass sample line 40 containing the sample cell 41 and a density gauge 42. The sample cell 41 corresponds to sample cell 14 in Figure 1 and a double faced X-ray source 10a is provided. The beta ray emitter 11a is preferably a two-sided strontium 90 source prepared in accordance with U.S. Patent 2,700,111. On each side of the source 11a is a molybdenum target 13a. Radiation from one side of the source 11a is transmitted through the sample in sample cell 41 to an ionization chamber 43. Radiation from the opposite side of the source 11a passes through a standard plastic wedge 44, and an aluminum wedge 45 to a second ionization chamber 46.

The current from the two ion chambers 43 and 46 are matched in opposition, each being provided with a high voltage D.C. power supply 47 and 48 which are of opposite polarity. The difference current from the ion chambers 43 and 46 is fed to a conventional and commercially available electrometer amplifier 49. The output current from the electrometer amplifier 49 is fed to a servo amplifier 50 which in turn is connected to the servo motor 51 for positioning the aluminum wedge 45 in the beam from the source 10a until the current from the two ion chambers 43 and 46 are equal. The TEL content of the sample within sample cell 41 is then determined from the position of the aluminum wedge 45. Also connected to the shaft of the servo motor 51 is the slide wire of a linear multi-turn potentiometer 54 and connected across the end terminals of the potentiometer is a constant D.C. voltage supply 55. The voltage between the slide wire and one of the end terminals corresponds to the position of the aluminum wedge 45. This voltage is fed to a suitable recorder 56 which is calibrated in terms of ccs. of tetraethyllead per gallon of sample gasoline.

A correction for the density of the base stock containing the metal or metal compound such as tetraethyllead can be made and a preferred system for so doing so is illustrated in Figure 8. To do this automatically, requires a device which will measure density and put out a signal which is a function of density. The details of one form of the density gauge and control circuitry for effecting such automatic correction is shown in Figures 9 and 10.

The density gauge 42 includes a chamber 60 having an inlet 40a and an outlet 40b which may be connected for flow from the sample line 40. A float 61 connected to a shaft 62 is disposed within the chamber 60 and a bellows 63 fixed about base 66 of the chamber 60 acts as a packing gland for the shaft 62. The transducer 52 is mounted by fixture 67 on the base 66, the displacement of the float 61 adjusting the transducer 52 through the shaft 62. The apparent weight of the float 61 varies with changes in the density of the liquid flowing through the chamber 60 and this apparent weight is impressed on the transducer 52 by means of the shaft 62. This changes the output voltage and for a given input voltage, the output voltage depends upon the apparent weight of the float 61 which, in turn, depends upon the density of the liquid sample under test. However, the force constant of the bellows 63 must be much less than that of the transducer 52 so that the bellows 63 will follow, and not influence, the motion of the float 61 and armature of the transducer 52.

Figure 10:
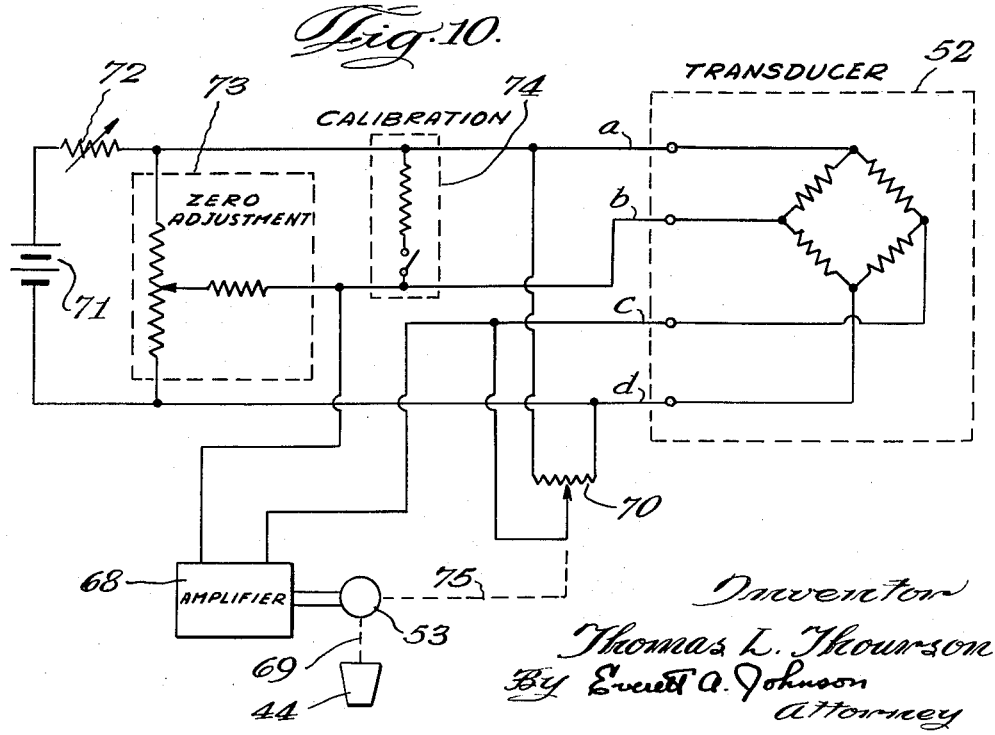
Figure 10 illustrates the circuitry for the density gauge and compensating wedge control.

Referring to Figures 8 and 10, the signal provided by the transducer 52 is fed to amplifier 68 and utilized in controlling the servo motor 53, which in turn, through a suitable mechanical linkage 69, positions the plastic absorber wedge 44. The motor 53 also moves the slide wire of a potentiometer 70 until the output of the transducer 52 is zero. The shaft position of the motor 53 is then a function of the density of the sample in chamber 60 and the wedge-shaped plastic absorber 44 is moved into or out of the reference beam from the source 10A to compensate for any changes in sample density. Accordingly the position of the aluminum wedge 45 is directly related to the tetraethyllead concentration of the sample.

Reverting to the transmission type targets, it is preferred to use molybdenum foil having a thickness of about .001 inch to about .005 inch. In the embodiment of Figures 2 to 7 the foil was about .001 inch. In general, for a given thickness targets of silver foil are comparable to foils of molybdenum. It is also contemplated that metals lying near and between silver and molybdenum in the periodic table and/or combinations of such elements in the form of alloys or laminations can be used as the target. Similarly, salts or other chemical compounds of these elements may be useful in certain applications of my technique.

Determinations of tetraethyllead in gasoline samples have been made employing the apparatus illustrated in Figures 2 to 7 inclusive with the beta ray emitter 11 comprising a 13.5 millicurie $Sr^{90}$ source, a 0.001 inch molybdenum target 13, and a krypton filled Geiger tube 21. The overall dimensions of our housing 16 are about 12.75 inches by 3.25 inches by 3.25 inches.

The results obtained were compared with concentrations determined by the conventional X-ray photometric apparatus which uses an X-ray tube and high voltage generating equipment. Our values differed from the "true" values by an average of 0.04 cc. TEL/gallon which about the probable error of the X-ray tube method. However, our apparatus is much less expensive, and is readily portable as compared to the X-ray tube apparatus; in addition our system has the advantages of rapidity and simplicity over the wet chemical methods of analysis.

Although we have described the invention in terms of specific examples and operations which have been set forth in some detail, it is to be understood that these are by way of illustration only and that our invention is not limited thereto. Alternative embodiments of apparatus and variations in operating techniques will become apparent to those skilled in the art in view of our disclosure.

Accordingly, modifications in the invention and the mode of using the apparatus are contemplated without departing from the spirit thereof.

What I claim is:

1. A system for determining the concentration of a known metal in a flowing hydrocarbon sample stream which comprises a pair of spaced ionization chambers arranged face to face, a source of X-rays disposed between said ionization chambers, said X-rays being substantially insensitive to carbon to hydrogen ratio of the sample, sample cell means adapted to flow a sample stream between said source and a first of said ionization chambers, first movable wedge means interposed said X-ray source and the second of said ionization chambers, means responsive to the differential of said radiation reaching said ionization chambers, density gauge means responsive to changes in the density of the sample under test, a second wedge means interposed said X-ray source and the second of said ionization chambers, drive means for said second wedge, and transducer, means responsive to said density gauge means controlling said drive means, whereby a radiation absorption measurement indicating the concentration of the metal in the sample is compensated for changes in a sample density.

2. The system of claim 1 wherein the density gauge comprises a flow chamber, a float in said chamber, and a shaft means moved by said float to actuate said transducer.

3. An apparatus for continuously determining the concentration of tetraethyllead in a flowing hydrocarbon sample stream which comprises means for subjecting such a flowing sample to X-ray radiation, said radiation being substantially insensitive to variations in the carbon to hydrogen ratio of the sample, means for simultaneously subjecting a variable standard absorber to like X-ray radiation, means for varying the standard absorber to equal the absorption by the sample, electrical circuit means responsive to radiation not absorbed by the sample, means for continuously obtaining an electrical quantity corresponding to changes in density of the flowing sample, and means for further varying the efficiency of the standard absorber to compensate for changes in density of the sample.

4. The method of continuously determining the concentration of tetraethyllead in a flowing hydrocarbon sample stream which comprises subjecting a flowing sample stream to X-ray radiation, said X-rays being substantially insensitive to carbon to hydrogen ratio of the sample, simultaneously subjecting a variable standard absorber means to like X-ray radiation, varying a portion of said absorber means to equal the X-ray absorption of the sample stream, continuously monitoring the density of the sample stream and obtaining an electrical quantity corresponding to any changes in density, adjusting the efficiency of another portion of said absorber means in response to said electrical quantity thereby to compensate for changes in density of the sample stream, and recording the adjusted position of said first portion of the said standard absorber as a measure of the concentration of tetraethyllead in said sample stream.

5. The apparatus of claim 3 wherein said variable standard absorber comprises an aluminum wedge portion and a plastic wedge portion.

References Cited in the file of this patent

UNITED STATES PATENTS

| | | |
|---|---|---|
| 2,467,812 | Clapp | Apr. 19, 1949 |
| 2,586,303 | Clarke | Feb. 19, 1952 |
| 2,757,290 | Jacobs et al. | July 31, 1956 |
| 2,844,066 | Friel | July 22, 1958 |